Aug. 5, 1958     H. S. POLIN     2,846,057
DEVICES FOR DOSAGE CONTROL
Filed Feb. 9, 1954

*INVENTOR.*
HERBERT SPENCER POLIN
BY
*ATTORNEYS*

United States Patent Office 2,846,057
Patented Aug. 5, 1958

2,846,057
DEVICES FOR DOSAGE CONTROL

Herbert Spencer Polin, Rio de Janeiro, Brazil

Application February 9, 1954, Serial No. 409,156

9 Claims. (Cl. 206—.5)

It is an object of this invention to provide a means whereby an accurately proportioned or limited concentration of a medicinal, a drug or a chemical may be fed automatically into a liquid stream at a point of use.

It is a further object of this invention to provide a chemical composition and a dispensing method whereby a soluble substance may be fed into a solvent at a predetermined concentration automatically established by the rate of the solvent flow.

It is a further object of this invention as one example of its wide utility to provide a means whereby a water soluble salt of fluorine may be fed into a drinking water supply outlet under controlled concentration.

This invention relates to methods for metering, under precise control, accurate small percentages of chemical substances by the use of a semipermeable membrane of specific permissive permeability related to the substance it is desired to control.

A further aspect of the invention is recognition of the elements in dialysis and diffusion control barriers which permit the combination of membrane-forming substances to achieve a desired diffusion rate.

The method proposed utilizes dialysis as the dispensing control mechanism, and, in one form of reducing this invention to practice, the pellet containing the sodium fluoride itself provides the dialyzing membrane.

In a dialyzing system, a membrane separates two liquids, one of which may be pure water flowing past the membrane. The other liquid may be a complex containing substances in true solution as well as substances in colloidal or partial suspension or substances which may be wetted. The composition of the membrane may be natural, such as animal or vegetable source materials, or, it may be synthetic, such as cellophane, collodion, treated gelatin, methyl cellulose or the like; or the membrane may be of low porosity inorganic substance pressed or cut or evaporated and condensed to a thin section, such as a ceramic, or clay or glass; or metal; or the combination of an inorganic low porosity material overlaid with a natural or synthetic membrane. To practice the teachings of this invention it is only necessary that the membrane, of whatever source or composition, and whatever its physical form or shape, have a porosity of sufficiently small dimension that it cannot function as a simple filter, but will permit diffusion through it only of substances characterized as crystalloidal in the art of dialysis.[1] Further, the rate of diffusion through a dialyzing membrane may be accurately controlled by reduction of the porosity within the range of its behavior as a dialyzing membrane, and by modifying the rate of flow of the liquid on the other side of the membrane.

Temperature of a dialyzing system plays a role in the rate of diffusion through a membrane, but a normal system is not sharply sensitive to variations in temperature unless the membrane itself is mechanically modified by such thermal extremes. In general, a higher temperature tends to increase diffusibility rates and a lower temperature will reduce them.

In the instance of the practice of this invention for the purpose of metering a fluoride into the drinking water system of a household, the range of temperatures encountered will have no harmful influence on the diffusion rate and the membrane selected for this application will be such as to resist any mechanical deformation due to temperature variation.

In the instance of a dialyzing pellet to be used as a medicinal metering dispenser for animal or human consumption, the ambient temperatures encountered in the body will be in a range of negligible influence upon the rate of diffusion.

In any application where temperature variations may fall within the range of influence upon diffusion rate, the membrane may be constructed with porosity and thickness dimensions of compensatory order.

Membrane porosity, in the practice of this invention, may vary from a few angstroms of diameter per opening, to several hundred millimicrons, as determined by the rate of flow selected for diffusing the crystalloid (in this instance the sodium fluoride), through the membrane and into the liquid (in this instance water), on the other side of the membrane.

In practice, a pellet enveloped with a cellophane membrane of predetermined thickness and porosity and containing say 30 milligrams of sodium fluoride, is exposed to the action of a stream of water. The rate of flow of the water past the pellet modulates the diffusion of the sodium fluoride through the membrane with the higher rate of flow increasing the rate of diffusion, thus proportioning the concentration of the sodium fluoride to the volume of water within the desired limits of one part per million. The pellet may take the form of a sealed capsule composed of a membraneous container within which the sodium fluoride is held in solution. In another form of practicing the invention, the dialyzing membrane may comprise a part of the dispensing unit to be affixed to a water outlet, the unit containing a cartridge or powdered sodium fluoride on the barrier side of the membrane. In another form of practicing the invention, a quantity of crystalline or powdered sodium fluoride is mixed with a solubilized membraneous substance, nitrocellulose for example in a volatile solvent, and allowed to solidify in the shape of a pellet. In this example, each discrete particle of sodium fluoride is enveloped in its own membrane and the rate of its diffusion in use is determined, in part, by the porosity of the membrane, which is controllable by the ratio of solvent to nitrocellulose in solution and the thickness of the film permitted during solidification. The composition of the pellet, it can be seen, can be varied over wide limits. It may consist of one or a combination of active constituents within a membrane, all of which are diffusible and, for purposes of bulking and handling, may also contain diffusible or non-diffusible inactive materials. The pellet may take the form of a semipermeable membrane containing an active material in solution. The pellet may be comprised of an active substance distributed in a membraneous carrier, whereby each particle is contained in its own dialyzing sack.

I have given as an example a description of the invention as applied to the dispensing of a salt into a water supply of the household. The container for exposing the pellet to the water flow during treatment may be illustrated by the form in the drawing, wherein.

The figures here referred to are for purposes of illustration only and are not to be taken as limiting in any sense. This is particularly true of those forms of the invention wherein it is used in agriculture or to be taken orally. Like numbers refer to like parts throughout.

Figure 1:
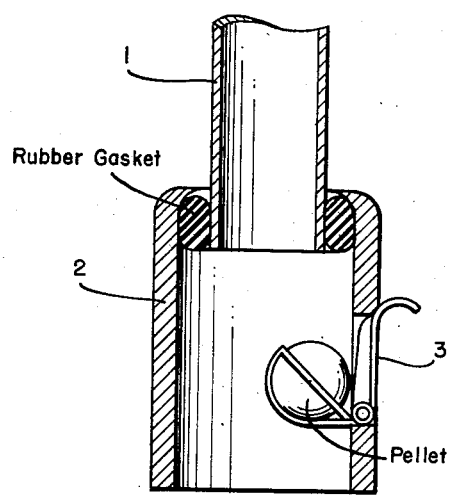
Figure 1 is an elevation view in section of one form the invention may take.
Figure 2:
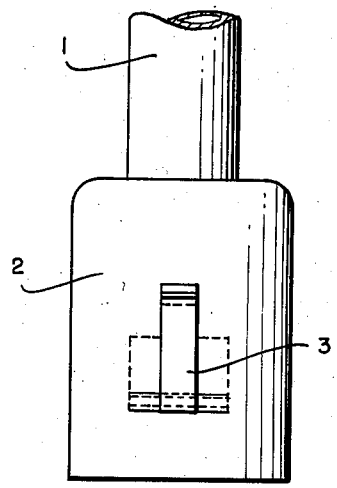
Figure 2 is a side elevation of Figure 1.

The method for metering small amounts of active ma-

[1] See Graham, Transaction Royal Society, London 151, 183 (1861), and Molecular Physics in Relation to Biology, National Research Council Bulletin #69 (May 1929), and Teorell, Proceedings Nat. Acad. Sci. U. S. 21, 152 (1935).

terial into a dynamic system by the means of controlled diffusion through dimensionally predetermined membranes may also have application in the field of medicine where it may be found desirable to administer a drug in pellet form in which the potency is distributed over an extended period of time. Such capsules have been developed heretofore, but these have operated on the principle of enzymatic degradation of a gelatinous container or of a progressively soluble shell and the curve of degradation rate has been shown to be erratic. Contrariwise, the invention herein described permits the active ingredient to perfuse only at a predetermined rate and in consequence, a constant level of concentration of the drug or substance can be maintained.

1 is the tip of a faucet to which is attached by rubber flange or by threaded screw fit, the dispenser 2, fabricated of plastic or metal. The unit contains a hinged support and cover 3, so arranged that the pellet, in operative position rests upon a supporting shelf projecting into the water flow stream from the faucet, and the hinged element forms the closure. In a modification of this design, the supporting shelf could include a secondary permanent membrane for dialysis as a margin of safety against possible injury of the membrane enveloping the pellet.

The manufacture of a pellet constructed in accordance with the teaching of this application may consist in the preparation of a powder composed of carrier substance and sodium fluoride thoroughly intermixed. The carrier substance may be cane sugar or the like, it having but one function: to make the pellet containing the predetermined minute quantity of sodium fluoride of a size convenient for handling after the carrier and the active ingredient have been compressed into a pellet of desired dimension to which a surface coating of the membrane forming substance in applied. It is obvious that the carrier could also include other substances of physiological desirability in a form in which they may be diffusible through the membrane at a rate conforming with the physical properties of the membrane and the rate of water flow past the pellet. The compressed pellet is covered externally with a membrane forming solution which may consist of cellulose acetate in acetone, the viscosity of the solution determining the porosity and thickness of the film remaining on the pellet after the evaporation of the solvent. The desired porosity is determined by establishing the rate of dialysis necessary to diffuse sodium fluoride into water flowing past the pellet in the ratio of 1 part per million. It is important that the pellet produced by this process have only a superficial film of the membrane forming substance to satisfy the conditions of film thickness and porosity which are essential to maintaining the metered accuracy of the membrane control.

A preferred method for preparing a pellet having the properties of controlled rate of dialysis consists in spreading a quantity of sodium fluoride onto a still moist film of membrance-thick membrane-forming substance, with or without carrier materials, and, when the film has dried putting together two or more such membranes and punching out pellets of desired dimension.

In the instance of a pellet for internal use, it may be desirable that the membrane be composed of substances like formaldehyde hardened gelatin, methyl cellulose or the like, having maximum compatibility with the body.

The method here described may also have utility as a means for imparting materials to the soil or to water tanks, as in hydroponics, for metering into a system a substance at a controlled rate.

The membrane or dialyzing envelope may be composed of a more complex group of coacting substances for special applications when particular selective dialyzing properties are found to be desirable. For example, a crude form of medicinal, such as a plant extract, or a crude hormone can be encased in a type of membrane having perma-selective properties, whereby the membrane will permit the diffusion only of the pure substance and at a predetermined rate, thus performing a metering and purifying function at the same time. Such a membrane may be constructed of a film of oxidized collodion or the like with the incorporation of ion exchange resins such as sulfonated polystyrene, or the like. The membrane may also be constructed entirely of an ion exchange substance, wherein the porosity and electrostatic behavior of which will control both the rate of diffusion and the character of substance which it will permit to pass through it. Substances of a resinous class which can serve as membranes for dialysis are acetyl cellulose, cellophane, viscose, glyptal, polyacrylics, nitrocellulose, polymers of the phenolic group, etc. In its broader aspects the invention comprises a device and method which may be incorporated as part of an overall system for controlling to a very fine degree the admixture of two or more substances over extreme relative concentrations.

Figure 3:
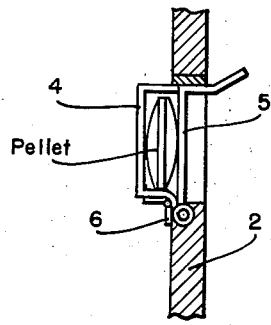
Figure 3 is an elevation in section of a modified form.

In the form shown in Figure 3 a removable auxiliary membrane receptacle is shown at 4, with a cover 5 and a closing spring 6. Powder can be substituted for the coated pellet 4.

What I claim is:

1. A pellet comprising a water soluble fluoride having a control-metering membranous coating of a specific permissive permeability correlated to the diffusibility coefficient of fluoride so that the rate of diffusion of said fluoride into a dynamic water system is at a predetermined constant value.

2. The combination of an active diffusible substance and a control-metering dialyzing membranous envelope therefor having a definite predetermined porosity, said porosity comprising control-metering means related to the diffusible characteristics of said substance and providing a controlled metered preselected diffusibility of said substance when placed in a fluid system, said membranous envelope comprising material having ion exchange properties.

3. The combination set forth in claim 2, said material being an ion-exchange resin.

4. The combination set forth in claim 3, said resin being sulfonated polystyrene.

5. The combination set forth in claim 2, said membranous envelope comprising material having electrostatic properties.

6. The combination set forth in claim 2 said envelope being made up of at least one material of a class including acetyl cellulose, viscose, glyptal, polyacrylics, nitrocellulose, polymers of the phenolic group and sulfonated polystyrene.

7. The combination set forth in claim 2, said material being an ion-exchange resin comprising a phenolic compound.

8. The combination set forth in claim 2, said membranous envelope comprising a body member having a thin metallic film evaporated thereon.

9. The combination set forth in claim 8, said member comprising material having ion-exchange properties.

References Cited in the file of this patent

UNITED STATES PATENTS

| Number | Name | Date |
| --- | --- | --- |
| 350,680 | Hyatt | Oct. 12, 1886 |
| 764,678 | Rosenthal | July 12, 1904 |
| 1,408,535 | Ressler | Mar. 7, 1922 |
| 1,476,090 | Lipsner et al. | Dec. 4, 1923 |
| 1,771,519 | Allen | July 29, 1930 |
| 2,023,459 | Bachman | Dec. 10, 1935 |
| 2,072,976 | Andrus | Mar. 9, 1937 |
| 2,232,153 | Vohrer | Feb. 18, 1941 |
| 2,238,588 | Hagopian | Apr. 15, 1941 |
| 2,339,885 | Schmid et al. | Jan. 25, 1944 |
| 2,368,035 | Moore | Jan. 23, 1945 |
| 2,478,182 | Consolazio | Aug. 9, 1949 |
| 2,643,226 | White | June 23, 1953 |